United States Patent
Pabon

(12) 
(10) Patent No.: US 11,023,128 B2
(45) Date of Patent: Jun. 1, 2021

(54) ON-DEMAND ELASTIC STORAGE INFRASTRUCTURE

(71) Applicant: Portworx, Inc., Santa Clara, CA (US)

(72) Inventor: Luis Pablo Pabon, Sturbridge, MA (US)

(73) Assignee: Portworx, Inc., Los Altos, CA (US)

( * ) Notice: Subject to any disclaimer, the term of this patent is extended or adjusted under 35 U.S.C. 154(b) by 313 days.

(21) Appl. No.: 15/923,258

(22) Filed: Mar. 16, 2018

(65) Prior Publication Data

US 2019/0286326 A1 Sep. 19, 2019

(51) Int. Cl.
*G06F 3/06* (2006.01)
*H04L 29/08* (2006.01)

(52) U.S. Cl.
CPC ............ *G06F 3/0604* (2013.01); *G06F 3/067* (2013.01); *G06F 3/0631* (2013.01); *G06F 3/0665* (2013.01); *H04L 67/1097* (2013.01)

(58) Field of Classification Search
CPC . H04L 67/1097; G06F 3/0604; G06F 3/0631; G06F 3/067
See application file for complete search history.

(56) References Cited

U.S. PATENT DOCUMENTS

| | | | | |
|---|---|---|---|---|
| 2002/0103889 | A1* | 8/2002 | Markson | H04L 67/1097 709/223 |
| 2014/0372723 | A1* | 12/2014 | Bobroff | G06F 11/3034 711/170 |
| 2016/0092132 | A1* | 3/2016 | Hildebrand | G06F 11/203 711/162 |
| 2016/0094410 | A1* | 3/2016 | Anwar | H04L 47/70 709/223 |
| 2017/0222890 | A1* | 8/2017 | Dippenaar | G06F 3/067 |

* cited by examiner

*Primary Examiner* — Chris Parry
*Assistant Examiner* — Steven C Nguyen
(74) *Attorney, Agent, or Firm* — ALG Intellectual Property, LLC

(57) ABSTRACT

A scalable storage infrastructure may be provided by dynamically adjusting the size of a storage volume implemented across one or more storage devices. When data is added to or removed from the storage volume, the system may compare the current amount of data stored on the volume to a threshold value. Then storage capacity may then be adjusted so as to accommodate future storage requests without maintaining an inefficiently large amount of reserved but unused storage space.

20 Claims, 5 Drawing Sheets

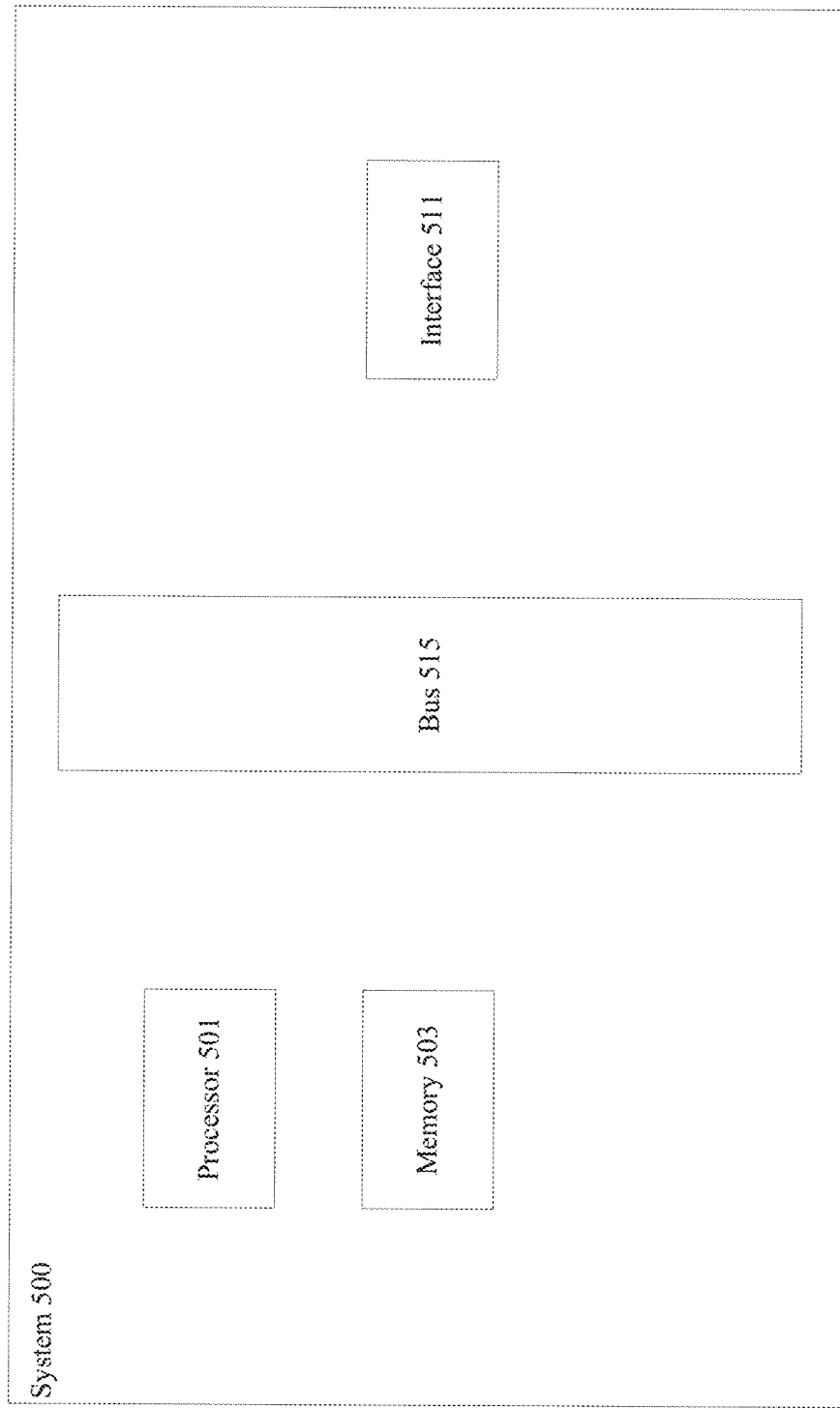

ON-DEMAND ELASTIC STORAGE INFRASTRUCTURE

TECHNICAL FIELD

The present disclosure relates generally to containerized applications and more specifically to containerized scalable storage applications.

DESCRIPTION OF RELATED ART

Storage systems are normally designed for an "on-premise" installation. This model requires the storage administrator to allocate and prepare the disks, compute, and network to define a topology for the storage system. However, "on-premise" installations have the drawback that computing resources may often be underutilized. Accordingly, many applications that employ storage are moving to execution within an on-demand cloud computing framework in which "on-premise" storage is inapplicable. Deploying an application in an on-demand cloud computing framework may involve providing a software-assisted storage solution.

When deploying applications in the cloud, both the hardware and software of the underlying computing device may vary considerably between different environments and different machines. Accordingly, one of the most difficult challenges facing software developers is interoperability of software between different computing environments. Software written to run in one operating system typically will not run without modification in a different operating system. Even within the same operating system, a program may rely on other programs in order to function. Each of these dependencies may or may not be available on any given system, or may be available but in a version different from the version originally relied upon. Thus, dependency relationships further complicate efforts to create software capable of running in different environments.

In recent years, the introduction of operating-system-level virtualization has facilitated the development of containerized software applications. A system configured with operating-system-level virtualization includes a container engine that operates on top of the operating system. Importantly, the container engine is configured to operate interchangeably in different environments (e.g., with different operating systems). At the same time, the container engine is configured to present a standardized interface to one or more software containers.

Each software container may include computer programming code for performing one or more tasks. Examples of software containers include web servers, email servers, web applications, and other such programs. Each software container may include some or all of the software resources that the software in the container needs in order to function. For example, if a software container includes a web application written in the Python programming language, the software container may also include the Python programming language modules that the web application relies upon. In this way, the software container may be installed and may execute successfully in different computing environments as long as the environment includes a container engine. One example of a containerized software application is a containerized software-assisted storage environment.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Various embodiments of the present invention relate generally to devices, systems, and methods for facilitating the provisioning of a dynamically adjustable storage volume. According to various embodiments, a request may be received to execute a storage volume event at a designated compute node implemented on a computing device that includes a processor and memory. The storage volume event may specify an action to be performed on a virtual storage volume, which may provide data storage space distributed across a plurality of storage devices. The storage volume event may be executed by performing the specified action on the virtual storage volume. The storage capacity of the virtual storage volume may be adjusted increase or decrease the storage capacity based on a determination as to whether a current storage capacity associated with the storage volume event falls above or below a storage volume capacity threshold.

According to various embodiments, each of the storage devices may be in communication with the designated compute node via a network. Each of the storage devices may be located at a different network endpoint.

In particular embodiments, the designated compute node may include a container engine application executed by an operating system. The container engine application may provide a standardized platform for the instantiation and execution of the containerized applications. The one or more containerized applications may include a storage driver configured to create and manage the virtual storage volume.

In some implementations, the storage volume capacity threshold may represent a low utilization watermark threshold, and the determination may evaluate whether the current storage capacity falls below the low utilization watermark threshold. The storage capacity of the virtual storage volume may be decreased when the current storage capacity falls below the low utilization watermark threshold.

In some implementations, the storage volume capacity threshold may represent a high utilization watermark threshold, and the determination may evaluate whether the current storage capacity exceeds the low utilization watermark threshold. The storage capacity of the virtual storage volume may be increased when the current storage capacity exceeds the high utilization watermark threshold.

In particular embodiments, the designated compute node may be one of a plurality of compute nodes, the plurality of compute nodes forming a distributed storage cluster.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

FIG. 5 illustrates an example of a server, configured in accordance with one or more embodiments.

DESCRIPTION OF EXAMPLE EMBODIMENTS

Figure 1:
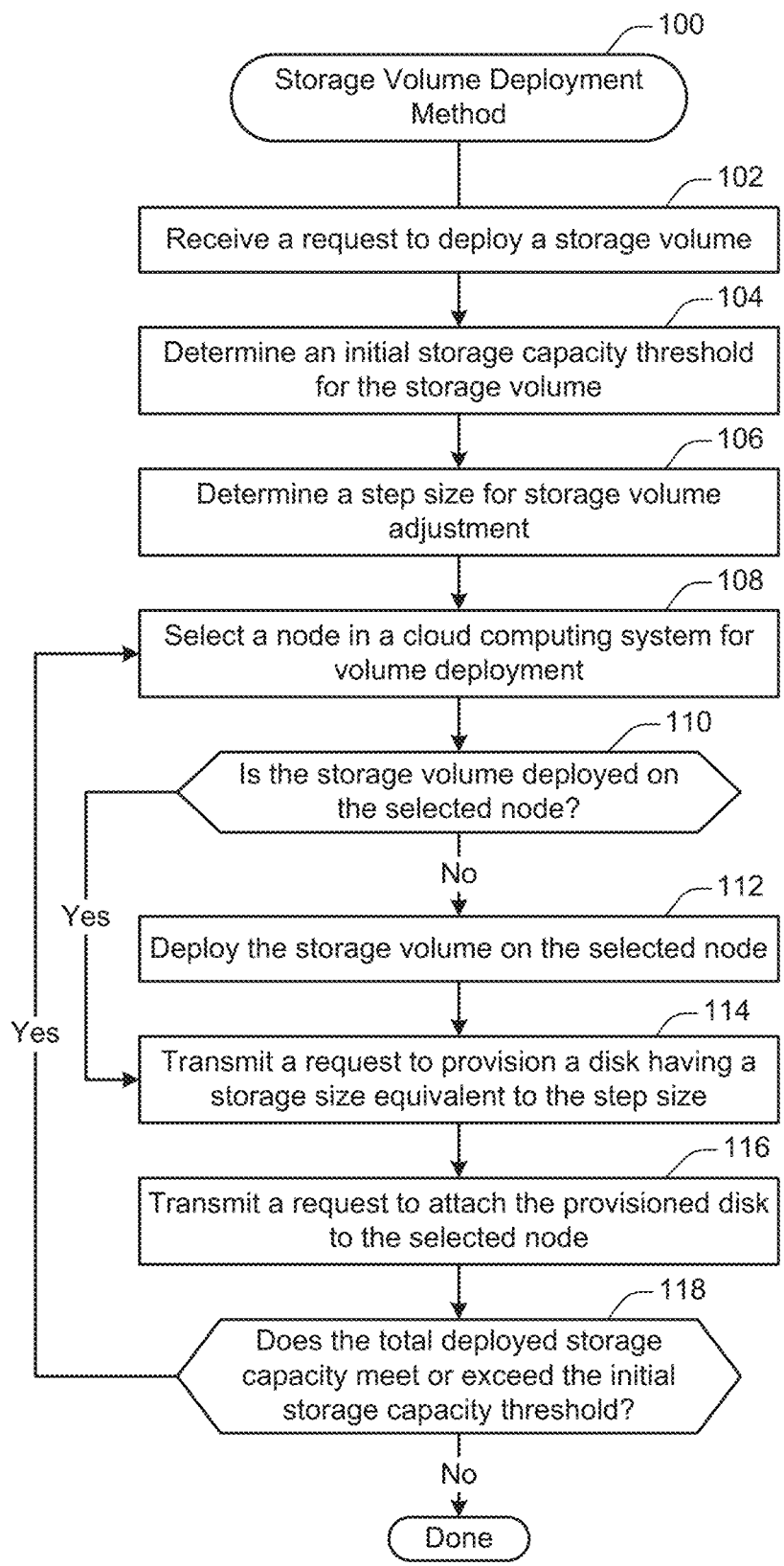
FIG. 1 illustrates an example of a method for deploying a storage system, performed in accordance with one or more embodiments.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular containerized storage environments. However, it should be noted that the techniques of the present invention apply to a wide variety of different containerized storage environments. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, a scalable on-demand storage cluster may include a custom storage driver to handle volume provisioning requests for the cluster. Upon initialization, the system may determine a parameter configuration for guiding the management of the cluster. The system may then automatically scale computing resources such as disk space included within the cluster as a function of the parameters and the cluster usage.

Example Embodiments

Storage systems are normally designed for an "on-premise" installation. This model requires the storage administrator to allocate and prepare fixed storage, computation, and networking resources to define a topology for the storage system. This method has the advantage that costs are known in advance but has the drawback of resulting in under-utilized computing resources. That is, if the system administrator specifies in advance a particular configuration of computing resources to be deployed, then the administrator must deploy excess resources to handle spikes within a variable workload.

The problem is exacerbated if the storage system utilization is less than expected. For example, a systems administrator may face high variability in the number of uses or other system characteristics. This variability may cause the actual amount of data stored on a system to be unpredictable and/or to exhibit high variation month-to-month.

The problem is particularly acute in the cloud. In an on-premise system, a purchased computing resource can remain dormant without the company incurring additional cost. However, a cloud computing resource reserved in advance costs the company the same amount, regardless of whether it is used. Nevertheless, administrators are often asked to expense in advance the entire total-cost-of-operation (TCO) of the disks allocated by the cloud provider for consumption by the storage system per month. Thus, the variable nature of cloud computing costs renders the efficient utilization of cloud computing resources an issue of particular concern for systems administrators.

Conventional techniques for implementing cloud-installed storage systems (e.g., Ceph, GlusterFS, ScaleIO) typically require the full/total allocation of disks which have a cost per gigabyte. This method is required so that the storage system can provide dynamically provisioned volumes to applications on demand. However, administrators of the storage system deployed in the cloud are constantly paying the maximum cost per month to the cloud provider. For example, on Amazon Web Storage, a 100 TB cluster implemented using conventional techniques at $0.10/gb would have a total cost of $10,240/month. With a 50% utilization of 50 TB, the total wasted payout would be $5,120/month. With a 25% utilization of 25 TB, the total wasted payout would be $7,680.

According to various embodiments, techniques and mechanisms described herein provide for improved systems for the management of a storage system in a cloud computing environment. Cloud provider assets may be added and removed from the storage system on demand. The capacity of the storage system may be expanded only when required, thus improving resource utilization efficiency and reducing costs. The system may also notice when utilization is low and shrink the storage cluster by removing underutilized cloud-provided disks, which also provides improved resource utilization efficiency and reduces costs. For instance, in the example discussed above, an administrator could potentially save close to $7,000 per month, thus reducing the TCO from $10,000 to close to $3,000.

In a containerized application system such as Docker, each compute node implements a container layer that runs in an operating system. The container layer acts as an intermediate layer to facilitate the execution of one or more container applications. The container system is standardized so that a container application may be instantiated on any of various operating systems and on any of various types of hardware.

In many configurations, potentially many instances of a container application are created on potentially many different nodes. A clustered storage solution can be employed to provide access to data. In a clustered storage solution, a virtual storage volume can be created. Such a virtual storage volume can span potentially many different physical disks and can be made accessible to any of the nodes.

According to various embodiments, a set of nodes may be initialized to provide an array of software services such as web applications supported by databases and web servers. Because many of these applications rely on reading or writing data to and from storage devices, a storage driver may be used to attach virtual volumes to nodes to provide access to storage.

According to various embodiments, a containerized application system in which software services are provided by application instances implemented across multiple nodes provides several advantages, such as scalability and dependency management. However, such a configuration creates substantial performance challenges. For example, if a database is implemented on one node while the storage volume used to manage data accessed by the database is mounted on another node, then performance may degrade significantly because every database read or write may require inter-node communication.

Techniques and mechanisms described herein may facilitate the operation of a scalable storage container node system. In some embodiments, a scalable storage container node system may allow application containers in a virtualized application system to quickly and directly provision and scale storage. Further, the system may be configured to provide one or more user experience guarantees across classes of applications. According to various embodiments, the system may pool the capacity of different services into virtual storage volumes and auto-allocate storage as application storage traffic scales or bursts. For instance, a single virtual storage volume may include hundreds or thousands of terabytes of storage space aggregated across many different storage devices located on many different physical machines. The techniques described herein provide for substantially improved performance of the computing itself by providing for more efficient utilization of computing resources.

In some embodiments, storage containers may communicate directly with server resources such as hardware storage devices, thus reducing or eliminating unnecessary virtualization overhead. Storage containers may be configured for implementation in a variety of environments, including both local computing environments and cloud computing environments. In some implementations, storage volumes created according to the techniques and mechanisms described herein may be highly failure-tolerant. For example, a virtual storage volume may include data stored on potentially many different storage nodes. A storage node may fail for any of various reasons, such as hardware failure, network failure, software failure, or server maintenance. Data integrity may be maintained even if one or more nodes that make up a storage volume fail during data storage operations.

According to various embodiments, a storage system that allows access by different computing devices is referred to herein as a "distributed storage system." Alternately, or additionally, such a storage system may be referred to herein as a "clustered storage system."

According to various embodiments, one or more configuration parameters may guide the provisioning of cloud disks. For instance, a Maximum Capacity parameter may specify the maximum storage capacity of the storage cluster. In the provisioning of cloud storage disks, the system may ensure that the maximum storage capacity is not exceeded. In one example a system may have a Maximum Capacity of 100 TB.

According to various embodiments, a Minimum Capacity parameter may specify the minimum storage capacity of the storage cluster. In the provisioning of cloud storage disks, the system may ensure that the system always has storage capacity of at least the minimum storage capacity. In one example a system may have a Minimum Capacity of 500 GB.

In some implementations, a High Utilization Watermark parameter may specify a threshold above which the storage capacity of the storage cluster may be automatically increased. For instance, when the storage capacity of the system exceeds the threshold, the system may automatically provision additional disks. In one example a system may have a High Utilization Watermark of 80%.

In some embodiments, a Low Utilization Watermark parameter may specify a threshold below which the storage capacity of the storage cluster may be automatically increased. For instance, when the storage capacity of the system falls below the threshold, the system may automatically identify devices to decommission from the storage system and return to the cloud storage provider. In one example a system may have a Low Utilization Watermark of 50%.

According to various embodiments, a Step parameter may specify an amount of storage automatically add or remove from the storage system. For instance, when the storage capacity of the system needs to be increased or decreased, the system may automatically request the addition or decommissioning of am amount of storage equal or approximately equal to the amount specified by this parameter. In one example a system may have a Step of 250 GB.

In some embodiments, one or more of these parameters may be specified by a user such as a systems administrator. Alternately, or additionally, one or more parameters may be determined automatically. For example, the Step parameter may be automatically set to a designated fraction of a value such as the Maximum Capacity or the Minimum Capacity. As another example, the High Utilization Watermark and/or the Low Utilization Watermark may increase as a function of the Maximum Capacity in order to avoid an excess amount of idle computing resources.

FIG. 1 illustrates an example of a method 100 for deploying a storage system, performed in accordance with one or more embodiments. According to various embodiments, the method 100 may be performed at any storage driver configured to manage a scalable virtual storage volume. For example, the method 100 may be performed at the storage driver 316 on Node A shown in FIG. 3, or at the privileged storage container 216 on the storage container node shown in FIG. 2. As another example, the method 100 may be performed at a storage driver on a local machine having access to one or more physical storage devices located on the local machine.

As used herein, a scalable virtual storage volume refers to any data storage presented as a logical unit for the purpose of data storage and backed by one or more physical storage devices. In some implementations, a physical storage device may be located at the same computing system on which the virtual storage volume is mounted. Alternately, a physical storage device may be located at a different computing system, such as one accessible via a network. In particular embodiments, a scalable virtual storage volume may include data storage located in different physical storage devices, which may themselves be located at the same or different network endpoints.

At 102, a request is received to deploy a storage system. According to various embodiments, the request may be generated manually. For instance, a systems administrator may send a request to deploy a storage volume to a computing node. Alternately, or additionally, a request to deploy a storage volume may be generated automatically, such as during the execution of a configuration script for a computing node.

At 104, an initial storage capacity threshold is determined for the computing system. According to various embodiments, the initial storage capacity threshold specifies a minimum initial amount of storage to include in the storage volume. For example, the initial storage capacity threshold may be 100 MB, 10 GB, 250 GB, 1 TB, or any other suitable amount.

In some implementations, the initial storage capacity threshold may be determined based on user input. For example, a systems administrator may specify an initial storage capacity threshold. Alternately, or additionally, the initial storage capacity threshold may be determined automatically, for instance based on an amount of data to be initially stored on the storage volume.

At 106, a step size for storage volume adjustment is determined. In some implementations, the step size specifies an amount of storage space by which the storage volume is increased or decreased. For example, the initial storage capacity threshold may be 10 MB, 10 GB, 250 GB, or any other suitable amount.

In some embodiments, the step size may be determined based on user input. For example, a systems administrator may specify a step size. Alternately, or additionally, the step size may be determined automatically. For instance, the step size may be determined based on the current and/or initial storage capacity. For example, the step size may be determined as a percentage (e.g., 5%, 10%) of the initial storage capacity. In some configurations, the step size may be updated or altered at a later point. For instance, if the size of the volume increases dramatically via automatic updating, then the step size may increase as well to maintain a sufficiently large storage margin to handle successive update requests.

At 108, a node in the cloud computing system is selected for volume deployment. According to various embodiments, a node may be selected based on any suitable criteria. For example, a node may be selected when it has a sufficient amount of computing resources available. As another example, a node already associated with the storage volume may be selected when it has a relatively small amount of storage capacity associated with the node compared to other nodes, in order to more evenly distribute storage capacity of the volume across the nodes. As yet another example, a node not already associated with the storage volume may be selected when the existing nodes already associated with the storage volume are each associated with a substantial amount of storage, in order to distribute storage capacity across a sufficient number of nodes.

At 110, a determination is made as to whether the storage volume is deployed on the selected node. According to various embodiments, the determination may be made by evaluating the applications running on the selected node. For example, a clustered system may track which nodes are running the storage driver. As another example, a list of local processes may be queried to determine whether the storage driver is running. If the storage driver is running, then the system may determine whether the storage driver at the selected node has access to the storage volume. An instance of the storage driver may maintain access to one or more different storage volumes.

At 112, the storage volume is deployed on the selected node. According to various embodiments, deploying the storage volume may involve operations such as initiating an instance of an application such as the storage driver. When the storage driver is instantiated, then the storage driver may instantiate access to the storage volume. For instance, the storage driver may create a new storage volume if one has not yet been created or store access information to an existing storage volume if one has been created by a different node.

At 114, a request is transmitted to provision a disk having a storage size equivalent to the step size. According to various embodiments, the operations performed to provision a disk may vary based on the particular context in which the storage system is implemented. For example, in a cloud computing system, a request to provision additional storage may be transmitted to the cloud computing system via the cloud storage application procedure interface. The request may, for instance, specify an amount of storage to be provisioned. As another example, in a local computing system, the storage driver may reserve an amount of storage space on a local drive that is equal to the step size.

At 116, a request is transmitted to attach the provisioned disk to the selected node. According to various embodiments, the operations performed to attach the provisioned disk may vary based on the particular context in which the storage volume is implemented. For example, in a cloud computing system, a request to attach the provisioned disk may be transmitted to the cloud computing system via the cloud storage application procedure interface. As another example, in a local compute node, the provisioned disk may already be attached by virtue of being locally accessible.

At 118, a determination is made as to whether the total deployed storage capacity meets or exceeds the initial storage capacity threshold. If the total deployed storage capacity does not meet the threshold, then the system may select a node for deploying additional storage resources to increase the size of the volume. The determination may be made based on a running total of volume size maintained by the storage system as disks are added and/or removed.

Figure 2:
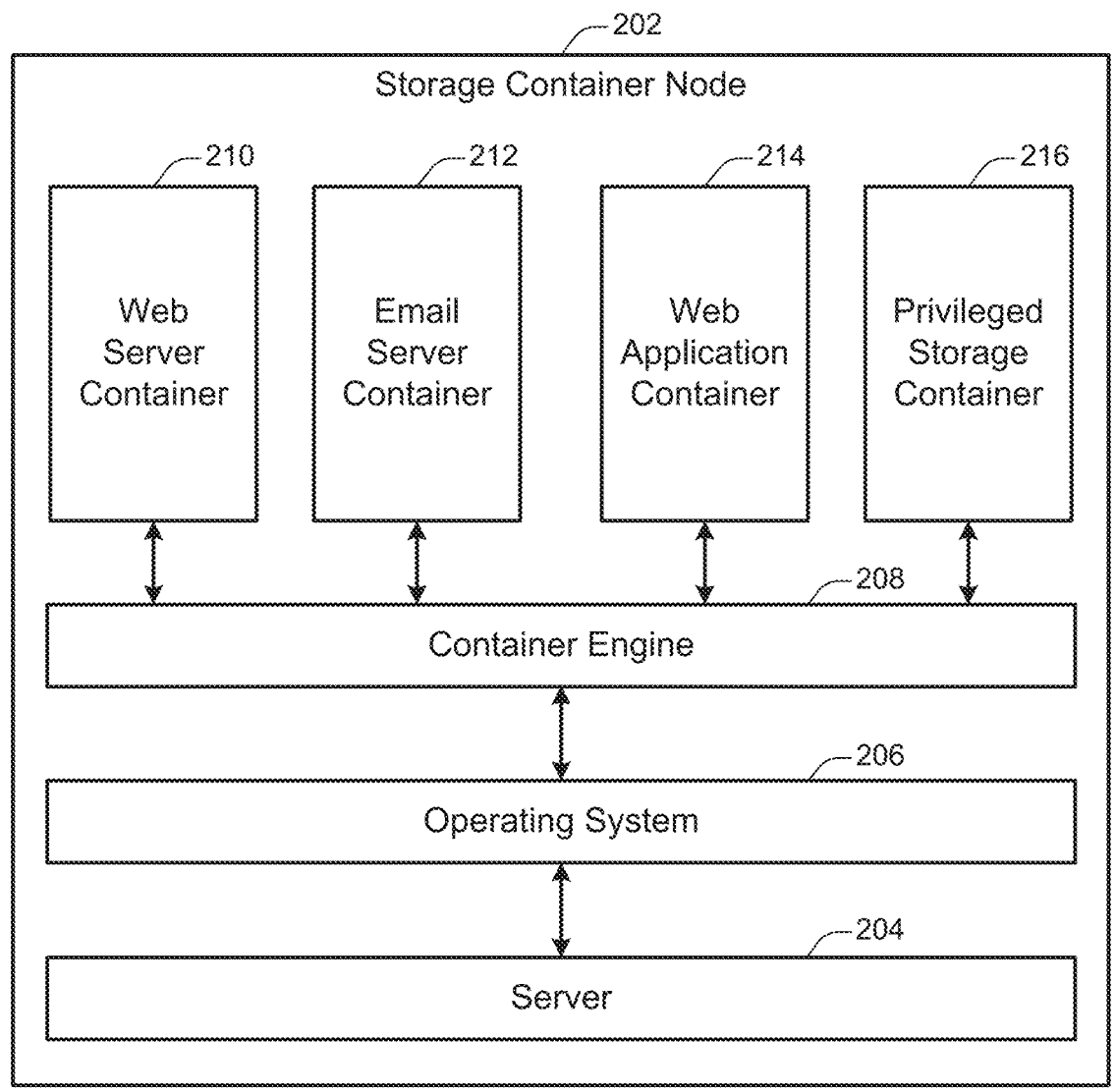
FIG. 2 illustrates an example of a storage container node, configured in accordance with one or more embodiments.

FIG. 2 illustrates an example of a storage container node 202. According to various embodiments, a storage container node may be a server configured to include a container engine and a privileged storage container. The storage container node 202 shown in FIG. 2 includes a server layer 204, an operating system layer 206, a container engine 208, a web server container 210, an email server container 212, a web application container 214, and a privileged storage container 216.

In some embodiments, the storage container node 202 may serve as an interface between storage resources available at a server instance and one or more virtual storage volumes that span more than one physical and/or virtual server. For example, the storage container node 202 may be implemented on a server that has access to a storage device. At the same time, a different storage container node may be implemented on a different server that has access to a different storage device. The two storage nodes may communicate to aggregate the physical capacity of the different storage devices into a single virtual storage volume. The single virtual storage volume may then be accessed and addressed as a unit by applications running on the two storage nodes or at on another system.

In some embodiments, the storage container node 202 may serve as an interface between storage resources available at a server instance and one or more virtual storage volumes that are replicated across more than one physical and/or virtual server. For example, the storage container node 202 may be implemented on a server that has access to a storage volume implemented on one or more storage devices. At the same time, a different storage container node may be implemented on a different server that has access to the same storage volume. The two storage nodes may then each access data stored on the same storage volume. Additional details regarding the configuration of multiple storage container nodes in the same system are discussed with respect to FIG. 3.

At 204, the server layer is shown. According to various embodiments, the server layer may function as an interface by which the operating system 206 interacts with the server on which the storage container node 202 is implemented. A storage container node may be implemented on a virtual or physical server. For example, the storage container node 202 may be implemented at least in part on the server shown in FIG. 5. The server may include hardware such as networking components, memory, physical storage devices, and other such infrastructure. The operating system layer 206 may communicate with these devices through a standardized interface provided by the server layer 204.

At 206, the operating system layer is shown. According to various embodiments, different computing environments may employ different operating system layers. For instance, a physical or virtual server environment may include an operating system based on Microsoft Windows, Linux, or Apple's OS X. The operating system layer 206 may provide, among other functionality, a standardized interface for communicating with the server layer 204.

At 208, a container engine layer is shown. According to various embodiments, the container layer may provide a common set of interfaces for implementing container applications. For example, the container layer may provide application programming interfaces (APIs) for tasks related to storage, networking, resource management, or other such computing tasks. The container layer may abstract these computing tasks from the operating system. A container engine may also be referred to as a hypervisor, a virtualization layer, or an operating-system-virtualization layer.

In some implementations, the separation of the computing environment into a server layer 204, an operating system layer 206, and a container engine layer 208 may facilitate greater interoperability between software applications and greater flexibility in configuring computing environments. For example, the same software container may be used in different computing environments, such as computing environments configured with different operating systems on different physical or virtual servers.

At storage container node may include one or more software containers. For example, the storage container node 202 includes the web server container 220, the email server container 212, and the web application container 214. A software container may include customized computer code configured to perform any of various tasks. For instance, the web server container 220 may provide files such as webpages to client machines upon request. The email server 212 may handle the receipt and transmission of emails as well as requests by client devices to access those emails. The web application container 214 may be configured to execute any type of web application, such as an instant messaging service, an online auction, a wiki, or a webmail service. Although that storage container node 202 shown in FIG. 2 includes three software containers, other storage container nodes may include various numbers and types of software containers.

At 216, a privileged storage container is shown. According to various embodiments, the privileged storage container may be configured to facilitate communications with other storage container nodes to provide one or more virtual storage volumes. A virtual storage volume may serve as a resource for storing or retrieving data. The virtual storage volume may be accessed by any of the software containers 210, 212, and 214 or other software containers located in different computing environments. For example, a software container may transmit a storage request to the container engine 208 via a standardized interface. The container engine 208 may transmit the storage request to the privileged storage container 216. The privileged storage container 216 may then communicate with privileged storage containers located on other storage container nodes and/or may communicate with hardware resources located at the storage container node 202 to execute the request.

In some implementations, one or more software containers may be afforded limited permissions in the computing environment in which they are located. For example, in order to facilitate a containerized software environment, the software containers 210, 212, and 214 may be restricted to communicating directly only with the container engine 208 via a standardized interface. The container engine 208 may then be responsible for relaying communications as necessary to other software containers and/or the operating system layer 206.

In some implementations, the privileged storage container 216 may be afforded additional privileges beyond those afforded to ordinary software containers. For example, the privileged storage container 216 may be allowed to communicate directly with the operating system layer 206, the server layer 204, and/or one or more physical hardware components such as physical storage devices. Providing the storage container 216 with expanded privileges may facilitate efficient storage operations such as storing, retrieving, and indexing data.

Figure 3:
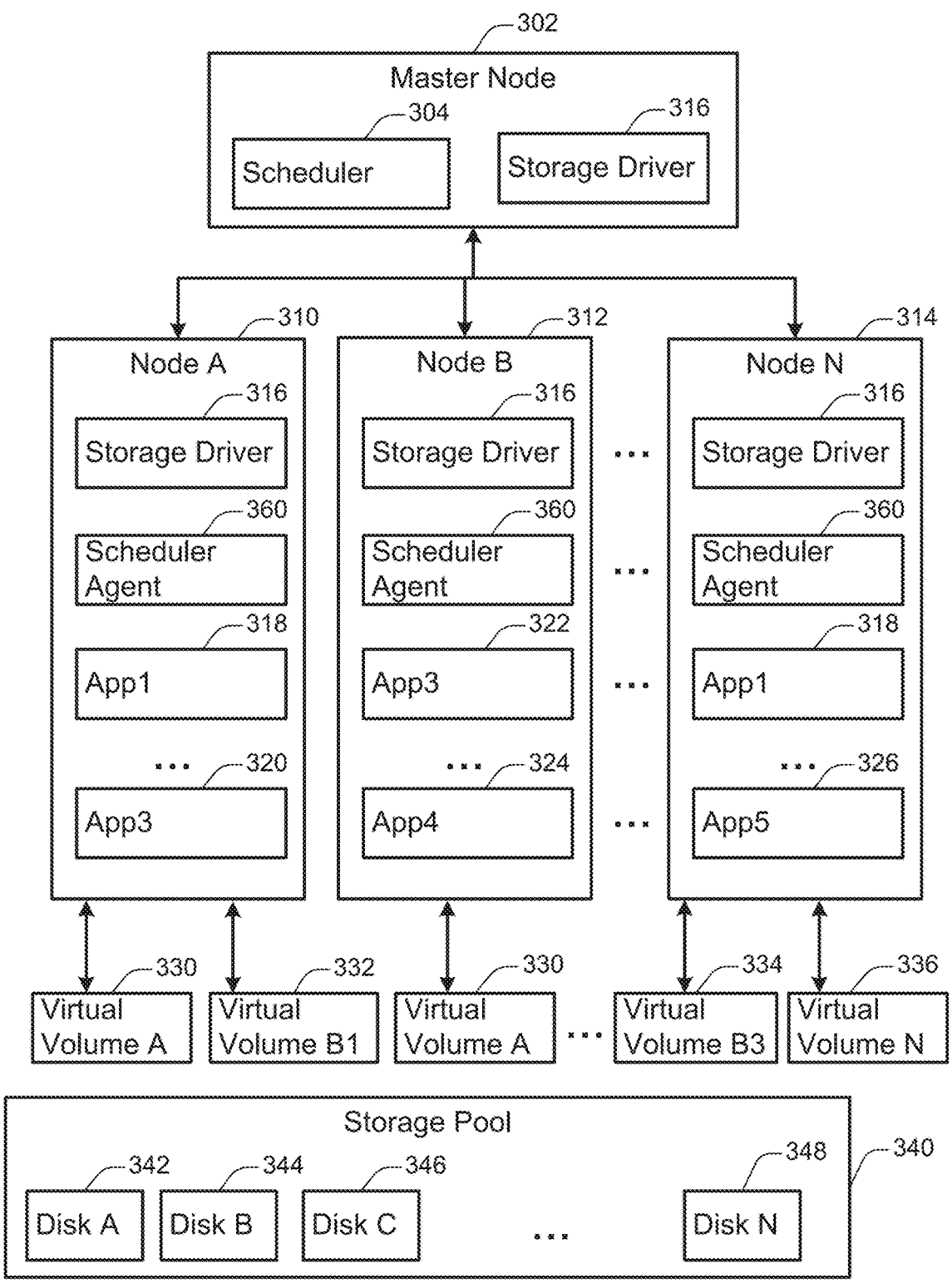
FIG. 3 illustrates an example of an arrangement of components in a containerized storage system, configured in accordance with one or more embodiments.

FIG. 3 illustrates an example of an arrangement of components in a containerized storage system 300, configured in accordance with one or more embodiments. The storage system 300 includes a master node 302 in communication with a plurality of application nodes 310, 312, and 314. Each node has implemented thereon a storage driver 316. In addition, the master node includes a scheduler 304. Each node can mount one or more of a plurality of virtual volumes 330, 332, 334, and 336. Each virtual volume can include storage space on one or more of a plurality of storage disks 342, 344, 346, and 348 in a storage pool 340.

According to various embodiments, the clustered storage system 300 shown in FIG. 3 may be implemented in any of various physical computing contexts. For example, some or all of the components shown in FIG. 3 may be implemented in a cloud computing environment such as Amazon Web Services (AWS), Microsoft Azure, or Google Cloud. As another example, some or all of the components shown in FIG. 3 may be implemented in a local computing environment such as on nodes in communication via a local area network (LAN) or other privately managed network.

In some implementations, a node is an instance of a container system implemented on a computing device such as the computing device shown in FIG. 5. In some configurations, multiple nodes may be implemented on the same physical computing device. Alternately, a computing device may contain a single node. An example configuration of a container node is discussed in further detail with respect to FIG. 2.

According to various embodiments, each node may be configured to instantiate and execute one or more containerized application instance. Each node may include many components not shown in FIG. 3. These components may include hardware and/or software components, such as those discussed with respect to FIG. 2 and FIG. 5.

According to various embodiments, each node may include a storage driver 316. The storage driver 316 may perform any of various types of storage-related operations for the node. For example, the storage driver 316 may facilitate the mounting or unmounting of virtual storage volumes. As another example, the storage driver 316 may facilitate data storage or retrieval requests associated with a mounted virtual storage volume. In some embodiments, the storage driver 316 may be substantially similar or identical to the privileged storage container 216 shown in FIG. 2.

According to various embodiments, each node may include a scheduler agent 360. The scheduler agent 360 may facilitate communications between nodes. For example, the scheduler 304 in the master node may communicate with the scheduler agent 360. The scheduler agent 360 may then communicate with the storage driver 360 to perform an operation such as initiating an application container instance or unmounting a virtual volume.

In some implementations, the disks 342, 344, 346, and 348 may be accessible to the container nodes via a network. For example, the disks may be located in storage arrays containing potentially many different disks. In such a configuration, which is common in cloud storage environments, each disk may be accessible for potentially many nodes to access. A storage pool such as the pool 340 may include potentially many different disks.

According to various embodiments, the virtual storage volumes 330, 332, 334, and 336 are logical storage units created by the distributed storage system. Each virtual storage volume may be implemented on a single disk or may span potentially many different physical disks. At the same time, data from potentially many different virtual volumes may be stored on a single disk. In this way, a virtual storage volume may be created that is potentially much larger than any available physical disk. At the same time, a virtual storage volume may be created in such a way as to be robust to the failure of any individual physical disk. Further, the virtual storage volume may be created in such a way as to allow rapid and simultaneous read access by different nodes. Thus, a single virtual storage volume may support the operation of containerized applications implemented in a distributed fashion across potentially many different nodes.

According to various embodiments, a virtual volume can be replicated across multiple nodes, for instance to support read-only access by different nodes. For example, in FIG. 3, the virtual volume A 330 is replicated across Node A 310 and Node B 312.

According to various embodiments, a virtual volume can be aggregated across multiple nodes. Such a configuration may support distributed and parallel reads and writes to and from the volume. For example, the virtual volume B1 332 and the virtual volume B2 334 shown in FIG. 3 are different data portions of the same virtual volume B.

According to various embodiments, each node may be configured to implement one or more instances of one or more containerized storage applications. For example, the node A 310 includes application instances corresponding with application containers App1 318 and App2 320, while the node B 312 includes application instances corresponding with application containers App3 322 and App4 324. In some configurations, more than one instance of an application container may be implemented at once. For example, the Node N 314 includes an instance of the application container App1 318 as well as App5 326.

In particular embodiments, an application container may correspond to any of a wide variety of containerized applications. For example, as discussed with respect to FIG. 2, a containerized application may be a web server 210, an email server 212, a web application 214, a database, or any of many other types of applications.

In some embodiments, the master node 302 is configured to manage the operations of the clustered storage system. For example, the scheduler 304 at the master node 302 may be configured to receive a request to mount a virtual volume for use at a particular node. The scheduler 304 may then communicate with that node to provide instructions to mount the virtual volume.

Figure 4:
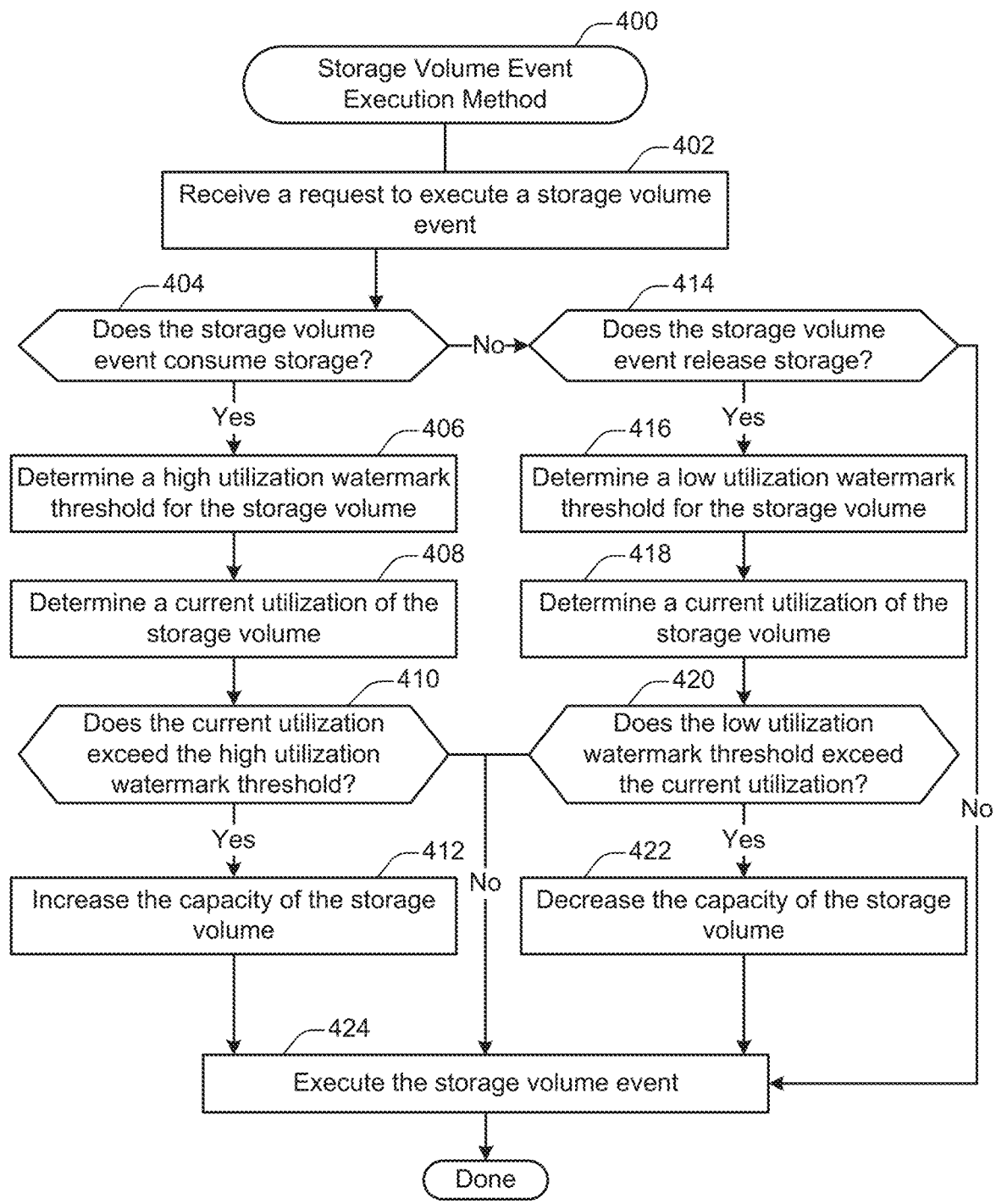
FIG. 4 illustrates an example of a method for executing a volume event, performed in accordance with one or more embodiments.

FIG. 4 illustrates an example of a method 400 for executing a volume event, performed in accordance with one or more embodiments. According to various embodiments, the method 400 may be performed at any computing node that has access to scalable storage. For example, the method 400 may be performed at the Node A 310 shown in FIG. 3.

At 402, a request to execution a storage volume event is received. According to various embodiments, the storage volume event may be any request to perform an action on a storage volume. For example, the storage volume event may be a request to store data to the volume, to delete data from the storage volume, or to move data between different locations on the storage volume.

In particular embodiments, the request may be received at a storage driver on a node in a clustered storage system implemented in a containerized application environment. For example, the request may be received at the storage driver 316 at the Node A 310 shown in FIG. 3.

At 404, a determination is made as to whether the storage volume event consumes storage. If not, then at 414 a determination is made as to whether the storage volume event releases storage. For example, a request to store data to the storage volume would be treated as a storage volume event that consumes storage. A request to delete data from the storage volume would be treated as a storage volume event that releases storage. A request to retrieve data from the storage volume would be treated as a storage volume event that neither consumes nor releases storage.

In some embodiments, the determination at 404 and 414 may be made logically based on the nature of the request. For instance, the storage volume request may include only a deletion request or only a data storage request.

In some implementations, the determination at 404 and 414 may be made empirically based on observing the changes made by executing the storage volume event. For instance, an amount of storage available on the system may be measured both before and after the execution of the storage volume event to determine whether the total storage amount increased or decreased.

If the storage volume event consumes storage, then at 406 a high utilization watermark threshold for the storage volume is determined. If instead the storage volume event consumes storage, then at 416 a low utilization watermark threshold for the storage volume is determined. According to various embodiments, these utilization watermark thresholds may be determined based on configuration information, such as the configuration information determined as discussed with respect to FIG. 1.

A current utilization of the storage volume is determined at 408 and 418. According to various embodiments, the current utilization of the storage volume may be maintained by the storage driver. For instance, the storage driver may maintain a table to facilitate the storage and retrieval of information from the storage volume. The storage driver may then update the table when data is added or removed from the storage volume. In particular embodiments, the storage driver may maintain a running total of the amount of data stored on the storage volume.

If the storage volume event consumes storage, then at 410 a determination is made as to whether the current utilization exceeds the high utilization watermark threshold. If instead the storage volume event consumes storage, then at 420 a determination is made as to whether the low utilization watermark threshold exceeds the current utilization. According to various embodiments, these determinations may be made by comparing the appropriate utilization watermark threshold with the current utilization of the storage volume.

If it is determined at operation 410 that the current utilization exceeds the high utilization watermark threshold, then at 412 the capacity of the storage volume is increased. If instead it is determined at operation 420 that the low utilization watermark threshold exceeds the current utilization, then at 422 the capacity of the storage volume is decreased. In some embodiments, the capacity of a storage volume may be increased or decreased by performing any suitable action to add or remove disk space from the volume.

For example, when a request is received to increase the size of a clustered storage volume implemented in a cloud computing system, the storage driver may transmit a request to add disk space via the appropriate application procedure interface. The cloud computing environment may then provide access to a network-accessible storage device having the appropriate amount of storage. Finally, the storage driver may logically expand the storage volume to include the newly-accessible storage space. As part of this expansion, the storage driver may move data from one storage device to another within the storage volume so as to better distribute the stored data across the different storage devices within the volume.

As another example, when a request is received to decrease the size of a clustered storage volume implemented in a cloud computing system, the storage driver may logically reduce the storage volume to exclude a block of storage space corresponding to the decrease in size. As part of this reduction, the storage driver may move data from one storage device to another within the storage volume so as to create one or more contiguous blocks of unused storage space. Then, the storage driver may transmit a request to remove disk space via the appropriate application procedure interface. Finally, the cloud computing environment may then remove access to the portion of the network-accessible storage device corresponding with the freed storage space.

In particular embodiments, the increase or decrease of the storage space may be performed on a local system that is not implemented in a cloud computing context. For example, a local machine may include one or more virtual storage volumes that each use storage space on one or more local storage devices. For instance, such a configuration may be useful to enforce data division for the purpose of security between different applications. In such a configuration, a virtual storage volume may be increased or decreased in size in a fashion similar to that employed in the cloud computing context.

At 424, the storage volume event is executed. According to various embodiments, executing the storage volume event may involve the storage driver performing one or more storage-related operations. For example, the storage driver may receive data from an application and store the data on the storage volume. As another example, the storage driver may retrieve data from the storage volume and provide the data to an application or store the data in temporary memory. As yet another example, the storage driver may move data from one location to another within the storage volume. As still another example, the storage driver may delete data stored on the storage volume.

According to various embodiments, the operations shown in FIG. 4 may be performed in an order different than that shown. For example, the storage volume event may be executed immediately after the execution of operation 402. As another example, one or more operations shown in FIG. 4 may be executed in parallel. As yet another example, the execution of the storage volume event may be performed in a different process, while operations shown in FIG. 4 may be executed as a side process triggered by the process by which the storage volume event is executed.

In particular embodiments, the method 400 shown in FIG. 4 may be executed on each and every storage volume event execution. Alternately, the method 400 shown in FIG. 4 may be executed periodically, or upon request. For example, the method 400 shown in FIG. 4 may be executed after a designated number of storage volume events or executed. As another example, the method 400 shown in FIG. 4 may be executed after the current utilization of the storage volume changes by at least a designated amount.

FIG. 5 illustrates one example of a server. According to particular embodiments, a system 500 suitable for implementing particular embodiments of the present invention includes a processor 501, a memory 503, an interface 511, and a bus 515 (e.g., a PCI bus or other interconnection fabric) and operates as a container node. When acting under the control of appropriate software or firmware, the processor 501 is responsible for implementing applications such as an operating system kernel, a containerized storage driver, and one or more applications. Various specially configured devices can also be used in place of a processor 501 or in addition to processor 501. The interface 511 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 500 is a server configured to run a container engine. For example, the system 500 may be configured as a storage container node as shown in FIG. 2 and FIG. 3. The server may include one or more hardware elements as shown in FIG. 5. In some implementations, one or more of the server components may be virtualized. For example, a physical server may be configured in a localized or cloud environment. The physical server may implement one or more virtual server environments in which the container engine is executed. Although a particular server is described, it should be recognized that a variety of alternative configurations are possible. For example, the modules may be implemented on another device connected to the server.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising:
   receiving a request to execute a storage volume event at a designated compute node, the designated compute node implemented on a computing device that includes a processor and memory, the storage volume event specifying an action to be performed on a virtual storage volume, the virtual storage volume providing data storage space distributed across a plurality of storage devices;
   determining whether a current utilization parameter associated with the storage volume event requires adjusting the storage capacity of the virtual storage volume based on the following parameters: minimum capacity, maximum capacity, high utilization watermark, low utilization watermark, and a step parameter, wherein the step parameter specifies the amount of change to the storage capacity, wherein the determining occurs each time after receiving a request to execute a storage volume event;
   executing the storage volume event by performing the specified action on the virtual storage volume; and
   based on a determination as to whether the current utilization parameter associated with the storage volume event falls above or below a predetermined threshold, adjusting the storage capacity of the virtual storage volume to increase or decrease the storage capacity, wherein adjusting storage capacity can include moving the storage data from one storage device to another.

2. The method recited in claim 1, wherein each of the storage devices are in communication with the designated compute node via a network.

3. The method recited in claim 2, wherein each of the storage devices is located at a different network endpoint.

4. The method recited in claim 1, wherein the designated compute node includes a container engine application executed by an operating system, the container engine application providing a standardized platform for the instantiation and execution of the containerized applications.

5. The method recited in claim 4, wherein the one or more containerized applications includes a storage driver configured to create and manage the virtual storage volume.

6. The method recited in claim 1, wherein the storage volume capacity threshold represents a low utilization watermark threshold, and wherein the determination evaluates whether the current storage capacity falls below the low utilization watermark threshold.

7. The method recited in claim 5, wherein the storage capacity of the virtual storage volume is decreased when the current storage capacity falls below the low utilization watermark threshold.

8. The method recited in claim 1, wherein the storage volume capacity threshold represents a high utilization watermark threshold, and wherein the determination evaluates whether the current storage capacity exceeds the low utilization watermark threshold.

9. The method recited in claim 7, wherein the storage capacity of the virtual storage volume is increased when the current storage capacity exceeds the high utilization watermark threshold.

10. The method recited in claim 1, wherein the designated compute node is one of a plurality of compute nodes, the plurality of compute nodes forming a distributed storage cluster.

11. A computing device comprising:
    a communications interface configured to receive a request to execute a storage volume event, the storage volume event specifying an action to be performed on a virtual storage volume, the virtual storage volume providing data storage space distributed across a plurality of storage devices;
    a processor operable to:
      determine whether a current utilization parameter associated with the storage volume event requires adjusting the storage capacity of the virtual storage volume based on the following parameters: minimum capacity, maximum capacity, high utilization watermark, low utilization watermark, and a step parameter, wherein the step parameter specifies the amount of change to the storage capacity, wherein the determining occurs each time after receiving a request to execute a storage volume event;
      execute the storage volume event by performing the specified action on the virtual storage volume, and
      adjust the storage capacity of the virtual storage volume to increase or decrease the storage capacity based on a determination as to whether the current utilization parameter associated with the storage volume event falls above or below a predetermined threshold, wherein adjusting the storage capacity can include moving storage data from one storage device to another.

12. The computing device recited in claim 11, wherein each of the storage devices are in communication with the computing device via a network, and wherein each of the storage devices is located at a different network endpoint.

13. The computing device recited in claim 11, further comprising:
    a container engine application executed by an operating system, the container engine application providing a standardized platform for the instantiation and execution of the containerized applications, and wherein the one or more containerized applications includes a storage driver configured to create and manage the virtual storage volume.

14. The computing device recited in claim 11, wherein the storage volume capacity threshold represents a low utilization watermark threshold, and wherein the determination evaluates whether the current storage capacity falls below the low utilization watermark threshold.

15. The computing device recited in claim 14, wherein the storage capacity of the virtual storage volume is decreased when the current storage capacity falls below the low utilization watermark threshold.

16. The computing device recited in claim 11, wherein the storage volume capacity threshold represents a high utilization watermark threshold, and wherein the determination evaluates whether the current storage capacity exceeds the low utilization watermark threshold.

17. The computing device recited in claim 16, wherein the storage capacity of the virtual storage volume is increased when the current storage capacity exceeds the high utilization watermark threshold.

18. The computing device recited in claim 11, wherein the computing device is configured to communicate with a plurality of compute nodes, the plurality of compute nodes forming a distributed storage cluster.

19. One or more non-transitory machine readable media having instructions stored thereon for performing a method, the method comprising:
    receiving a request to execute a storage volume event at a designated compute node, the designated compute node implemented on a computing device that includes a processor and memory, the storage volume event specifying an action to be performed on a virtual storage volume, the virtual storage volume providing data storage space distributed across a plurality of storage devices;
    determining whether a current utilization parameter associated with the storage volume event requires adjusting the storage capacity of the virtual storage volume based on the following parameters: minimum capacity, maximum capacity, high utilization watermark, low utilization watermark, and a step parameter, wherein the step parameter specifies the amount of change to the storage capacity, wherein the determining occurs each time after receiving a request to execute a storage volume event;
    executing the storage volume event by performing the specified action on the virtual storage volume; and
    based on a determination as to whether the current utilization parameter associated with the storage volume event falls above or below a predetermined threshold, adjusting the storage capacity of the virtual storage volume to increase or decrease the storage capacity, wherein adjusting the storage capacity can include moving storage data from one storage device to another.

20. The one or more non-transitory machine readable media recited in claim 19, wherein the designated compute node includes a container engine application executed by an operating system, the container engine application providing a standardized platform for the instantiation and execution of the containerized applications, and wherein the one or more containerized applications includes a storage driver configured to create and manage the virtual storage volume.

* * * * *